United States Patent Office 3,199,289
Patented Aug. 10, 1965

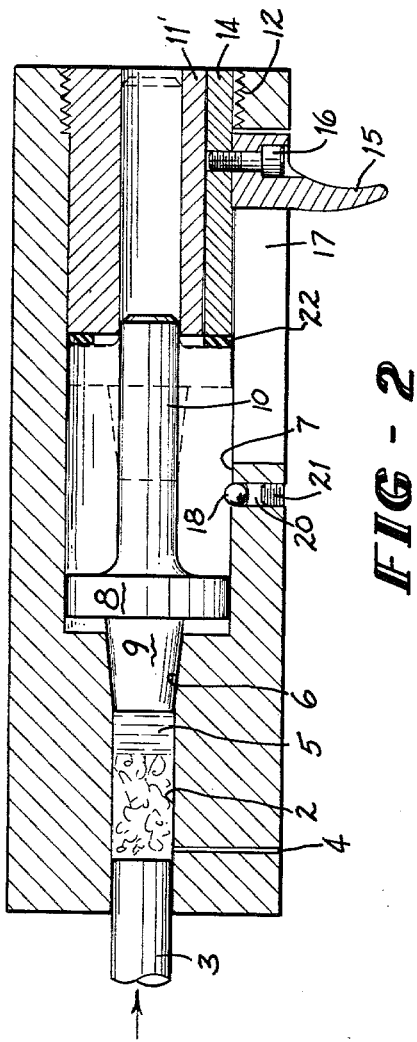

3,199,289
SEAL AND SHOT START DEVICE
Marcus Ramsay, New Haven, and Glenn R. Dixon, Hamden, Conn., assignors to Olin Mathieson Chemical Corporation, a corporation of Virginia
Filed Apr. 29, 1963, Ser. No. 276,411
10 Claims. (Cl. 60—26.1)

This invention relates to apparatus having a working piston which is powered by the pressure resulting from the combustion of a liquid propellant.

This invention more specifically relates to an apparatus powered by the compression ignition of a liquid propellant. The apparatus includes a combustion chamber pneumatically sealed at one end by a locking taper and at the other end by a compression piston. A liquid propellant injected into the combustion chamber is ignited by the adiabatic compression of the propellant. The locking taper is formed by a male tapered member integral with a working piston seated in a tapered opening or socket in the combustion chamber. The locking taper thus formed is effective to seal the combustion chamber as the propellant is compressed by the compression piston. After the propellant has been compressed to ignition, the increased pressure in the combustion chamber due to combustion of the propellant is effective to release the locking taper and drive the working piston forward. The forward movement of the piston can be utilized to perform useful work such as driving fasteners or studs into a surface.

In order to satisfactorily utilize the principle of compression ignition of a liquid propellant to power a work performing piston; the compression chamber must be pneumatically sealed by means which will resist opening to a pressure substantially greater than that required to obtain ignition. Stated in another way, the combustion chamber must remain closed while the liquid propellant is compressed to a pressure sufficient for ignition. Once ignition has occurred, the combustion chamber must open quickly to permit the increased pressure due to combustion to act on the working piston.

According to this invention, a locking taper is used to provide the initial seal between the combustion chamber and the working piston. A male tapered member is connected to or formed integral with the working piston and a corresponding female taper is formed in the combustion chamber. This novel arrangement of elements in a liquid propelled device eliminates the necessity for separate valving between the combustion chamber and the piston and the resultant loss of energy which occurs through such valves due to leakage.

The principal advantage of this invention resides in its simplicity. No complicated valve structures or locking detents are required between the combustion chamber in which the liquid propellant is ignited by adiabatic compression and the work performing piston to which the pressure must be transmitted in order to utilize the pressure as a work performing force. It has been found that a locking taper including a tapered male member formed integral with or connected to one end of the work performing piston can be seated in a tapered end or socket of the combustion chamber to hold with a force sufficient to retard movement of the work performing piston as the liquid propellant is compressed to ignition in the combustion chamber. Once the liquid propellant has been compressed to a pressure sufficient to cause adiabatic ignition of the propellant, a tremendous increase in pressure due to combustion unseats the locking taper and allows the working piston to be driven forward by the pressure of combustion.

It should be understood at this point that the principle of utilizing a locking taper to seal a combustion chamber is applicable to liquid propelled devices in which the liquid propellant is ignited by more conventional means such as a spark. It is felt, however, that the maximum value of the locking taper is obtained in a device in which the propellant is ignited by adiabatic compression. Accordingly, the device described and illustrated in this invention is powered by a liquid propellant ignited by adiabatic compression of the propellant.

This invention will now be described in detail with reference to the accompanying drawings in which:

FIGURE 1 is a sectional side view of a tool illustrating the features of this invention.

FIGURE 2 is a modified embodiment of the tool of FIGURE 1 incorporating a manual lever for seating the taper valve in locked position.

FIGURE 3 is an end view of FIGURE 2.

Referring now to FIGURE 1, a barrel generally indicated 1 is provided with a combustion chamber 2. The combustion chamber 2 is sealed at one end by a compression piston 3. A port 4 is provided in the barrel 1 to provide access to the interior of the combustion chamber. A liquid propellant 5 is injected into the combustion chamber 2 through port 4 by pump means not shown. The opposite end of the combustion chamber 2 is formed with a female taper or socket 6, the function of which is described below. The barrel 1 is further provided with a piston chamber 7. Slidably mounted in piston chamber 7 is a working piston 8. Formed integral with or secured to one end of the working piston 8 is a male taper 9. Formed integral with the opposite end of piston 8 is a drive rod 10 adapted to engage and drive a fastener or the like (not shown) into a work surface. The male taper 9 is engaged in the female taper 6 to form a locking taper providing a seal between the combustion chamber 2 and the working piston 8. A barrel guide 11 is fastened to the barrel by screw threads 12 or the like to guide drive rod 10 and to receive a fastener or stud (not shown) which may be positioned in the barrel guide. A buffer 22 which may be metal, rubber or any suitable material is mounted between piston 8 and barrel guide 11.

In operation, male taper 9 is seated in the female taper 6 in barrel 1 with a slight tap to form a locking taper sealing one end of combustion chamber 2. A liquid propellant 5 is injected into combustion chamber 2 through port 4 by pump means not shown. Compression piston 3 is brought forward in the direction of the arrow to compress the propellant with a force sufficient to ignite the propellant adiabatically. The locking taper has a holding force sufficient to withstand the pressure applied to the propellant as it is compressed to ignition and to maintain the seal between the combustion chamber and the piston. As soon as the propellant is ignited, an increase in pressure occurs instantaneously in the combustion chamber which is sufficient to unseat the locking taper. The increased pressure caused by combustion of the ignited propellant is then transmitted to working piston 8. Piston 8 and drive rod 10 move forward driving a fastener, punch or similar device which can perform useful work.

At the end of its travel, piston 8 is stopped by buffer 22. It should be understood that the working piston can be provided with sealing rings and the like if necessary to prevent the gases of combustion from blowing by the piston and being wasted.

It has been found that a slight tap on the piston 8 or drive rod 10 will seat the male taper 9 in the female taper 6 so that it will release only if a pressure on the order of 1000–5000 p.s.i. is applied against the head of the male taper. This pressure range is well above that which is required to compress the propellant to ignition. In the embodiment of FIGURE 1, this slight tap can be imparted to the locking taper by inserting a rod through barrel guide 11 and tapping or bumping the rod to seat the locking taper. In the embodiment of FIGURE 2, a sliding lever is provided to perform this function and will now be described in detail.

In the embodiment of FIGURE 2, like reference numerals are used to designate parts which are identical to those in the embodiment of FIGURE 1. The barrel guide 11', as seen in FIGURE 2, is provided with a channel 13 as clearly seen in FIGURE 3. Slidably mounted in the channel 13 is an operating rod 14. The operating rod 14 is provided with a finger lever 15, which is secured to the rod 14 by means of a screw 16. The finger lever projects outwardly through a slot 17 in the side wall of the barrel. The slot 17 is an elongated opening in the side wall of the barrel. A ball detent 18 is mounted in the side wall of the barrel above the slot 17. The ball detent 18 projects slightly into the piston chamber 7 and is spring biased in this position by spring means 20 which can be a coil spring or a piece of resilient material such as rubber. Spring means 20 is held in position by set screw 21.

The operation of the embodiment of FIGURE 2 is the same as that of the embodiment of FIGURE 1. The male taper 9 is seated in the female taper or socket 6 of the combustion chamber. Compression piston 3 is moved forward in the direction of the arrows and compresses the propellant 5 until the propellant is ignited by adiabatic compression. The increased pressure in the combustion chamber effectively unseats the locking taper and drives the working piston forward to the dotted line position shown in FIGURE 2 where it is stopped by buffer 22. To return the working piston 8 and reseat the locking taper in its firing position, finger lever 15 and rod 14 are moved toward ball detent 18. Rod 14 engages working piston 8 and moves the working piston towards the combustion chamber 2 with very little resistance. As the piston 8 encounters the ball detent 18, its movement is resisted by the force of the ball detent which is urged outwardly by spring means 20. An increase force on the finger lever is therefore necessary to move the piston 8 past the ball detent. As soon as the piston 8 clears the ball detent, the force exerted on the piston by the ball detent is immediately released and the working piston 8 and the male taper 9 are accelerated toward the combustion chamber 2. This accelerated motion of the piston and male taper is effective to seat the male taper 9 in the female taper 6 with the same effect as if the locking taper had been tapped into its seated locking position.

Although this invention has been described in detail in accordance with the preferred embodiments illustrated in the drawings, it is contemplated that various modifications and design changes will occur to those skilled in the art which are within the spirit and scope of the appended claims.

We claim:

1. A tool powered by a liquid propellant mixture including a barrel, a working piston slidably mounted in said barrel, a combustion chamber in said barrel having a tapered opening at one end, a tapered head joined to said piston, said tapered head and said tapered opening operative when seated to form a locking taper effective to pneumatically seal said combustion chamber, said locking taper sealing said combustion chamber to a predetermined pressure level and releasing when said predetermined pressure level is exceeded so that the pressure in said chamber can act on said piston to drive said piston forward in said barrel, a compression piston slidably mounted in said combustion chamber and operative to compress said propellant to ignition, said predetermined pressure necessary to release said locking taper being well above the level necessary to accomplish compression ignition of said propellant mixture.

2. The device of claim 1 in which means mounted in said barrel is operative to seat said tapered head in said tapered opening with a force sufficient to effect a lock.

3. In a device powered by the compression ignition of a liquid propellant including a barrel, a combustion chamber in said barrel, a port in said chamber for introducing a liquid propellant ignitable at a predetermined pressure, means in said chamber for compressing said propellant to ignition, a piston chamber in said barrel having one end opening to said combustion chamber, a working piston slidably mounted in said piston chamber, quick release means in said barrel adapted to form a pneumatic seal between said combustion chamber and said piston chamber, said quick release means being operative to pneumatically seal said combustion chamber to pressures above that required for ignition of said propellant and to quickly open said combustion chamber at a predetermined increased pressure so that pressure generated in said chamber by the combustion of said propellant can act on said piston.

4. The device of claim 3 in which said quick release means is a tapered head connected to said working piston and seated in a tapered end of said combustion chamber to provide a locking taper adapted to unseat at said predetermined increased pressure.

5. The device of claim 3 in which said means in said chamber is a piston slidably mounted in said combustion chamber and operative to compress said liquid propellant to ignition.

6. An explosively actuated tool having a barrel, a combustion chamber at one end of said barrel, said combustion chamber having a port opening to the interior of said chamber for receiving a liquid propellant ignitable at a predetermined pressure, said chamber including a tapered opening at one end, a piston slidably mounted in said barrel, said piston including a tapered rear portion for slidably seating reception in said tapered opening a reduced front portion and a piston head intermediate said portions, a compression piston slidably mounted in said combustion chamber and operative to compress said propellant to ignition, said tapered opening in said combustion chamber and said tapered rear portion of said piston forming a locking taper operative to seal said combustion chamber until compression ignition is accomplished and sufficient increased pressure is developed in said chamber by the combustion of said propellant to drive said piston forward with an impacting force.

7. The device of claim in which a guide member is mounted in said barrel to guide said reduced front portion of said piston as the piston is moved forward.

8. The device of claim 7 in which return means connected to said piston is operative to move said piston to its initial position after firing, and friction means mounted in said barrel is engageable with said return means so that said locking taper is seated with a slight tap.

9. A tool comprising a barrel, a combustion chamber in said barrel, a piston chamber in said barrel adjacent said combustion chamber, a working piston slidably mounted in said piston chamber, a tapered portion in said combustion chamber adjacent said piston chamber, a tapered head formed integral with said working piston adapted to seat in said tapered portion to form a locking taper pneumatically sealing said combustion chamber from said piston chamber, a port opening into said chamber for introducing a liquid propellant into said combustion chamber, a compression piston slidably mounted in said combustion chamber and operative to compress said liquid propellant to ignition, said locking taper being operative to pneumatically seal said combustion until a predetermined pressure is reached in said combustion chamber which is greatly above the pressure necessary to achieve compression ignition of said propellant.

10. The device of claim 9 in which means is provided in said barrel for seating said tapered head in said tapered portion with a slight tap.

References Cited by the Examiner
UNITED STATES PATENTS

| | | | |
|---|---|---|---|
| 1,914,250 | 6/33 | Gillen | 60—26.1 X |
| 2,030,686 | 2/36 | Davis | 60—26.1 X |

JULIUS E. WEST, *Primary Examiner*.